United States Patent [19]

Roméas

[11] Patent Number: 4,858,221
[45] Date of Patent: Aug. 15, 1989

[54] PREFORMATTED INFORMATION MEDIUM AND OPTICAL READER DEVICE

[75] Inventor: René Roméas, Palaiseau, France

[73] Assignee: Societe Anonyme Dite: Alcatel Thomson Gigadisc, Paris, France

[21] Appl. No.: 861,313

[22] Filed: May 9, 1986

[30] Foreign Application Priority Data

May 10, 1985 [FR] France .................... 85 07131

[51] Int. Cl.$^4$ ............... G11B 7/09; G11B 7/24
[52] U.S. Cl. .................... 369/275; 369/44; 369/279; 360/77.11
[58] Field of Search ............ 369/275, 277, 278, 279, 369/44, 32, 276; 360/77, 77.11

[56] References Cited

U.S. PATENT DOCUMENTS

| | | | |
|---|---|---|---|
| 3,673,412 | 6/1972 | Olson | 365/215 |
| 3,919,697 | 11/1975 | Walker | 358/342 |
| 4,027,330 | 5/1977 | Maslowski | 369/279 |
| 4,443,870 | 4/1984 | Hazel | 369/275 |
| 4,455,632 | 6/1984 | Brast | 369/45 |
| 4,456,981 | 6/1984 | Silvy | 365/234 |
| 4,472,748 | 9/1984 | Kato | 360/59 |
| 4,486,791 | 12/1984 | Wada | 358/342 |
| 4,530,079 | 7/1985 | Millar | 369/275 |
| 4,543,617 | 9/1985 | Kobayashi | 358/342 |
| 4,553,228 | 11/1985 | Gerard | 369/275 |
| 4,707,816 | 11/1987 | Yonezawa | 369/275 |

FOREIGN PATENT DOCUMENTS

| | | | |
|---|---|---|---|
| 64897 | 11/1982 | European Pat. Off. | 369/111 |
| 89274 | 9/1983 | European Pat. Off. | 369/44 |
| 89734 | 9/1983 | European Pat. Off. | 365/234 |
| 3225809 | 2/1983 | Fed. Rep. of Germany | 358/342 |
| 2067313 | 7/1981 | United Kingdom | 369/44 |
| 2109150 | 5/1983 | United Kingdom | 369/43 |

*Primary Examiner*—Alan Faber
*Assistant Examiner*—James E. Tomassini
*Attorney, Agent, or Firm*—Cushman, Darby & Cushman

[57] ABSTRACT

The invention relates to optical memories making use of optical interaction between an incident ray and an information medium (83) capable of having data written thereon and of having data read therefrom, which data is organized in a adjacent track elements which are marked by prerecorded patterns. The invention provides an information medium (83) and a reader device therefor (84, 85, 86, 87, 88) including means (89, 91, 92, 93, 94) for sampled tracking of the track elements on the basis of patterns which are offset from the track scan line, said patterns forming discontinuous periodic wave sequences whose offset edges are symmetrically disposed about the middle of the inter-track gap. The invention is particularly applicable to optical memories using a preformated disk capable of recording, of being read, and where appropriate of being erased, with data in digital form.

12 Claims, 5 Drawing Sheets a)

b)

c)

d)

PREFORMATTED INFORMATION MEDIUM AND OPTICAL READER DEVICE

FIELD OF THE INVENTION

The present invention relates to optical memories for storing data in reserved areas on the surface of an information medium. In order to provide fast and easy access to data areas, this type of information medium may be in the form of a disk whose reference surface is split up into regularly spaced track elements. The track elements may, for example, follow the path of spiral turns in a constant pitch spiral which is centered on the center of a centering orifice. The data areas may also be subdivided angularly into sectors, and the sectors may be subdivided into blocks for containing data and for containing the addresses which are essential for addressing track elements and sectors. By virtue of this radial and angular distribution of data areas, the handling of data transcription can be particularly flexible using a read/write head which is displaceable radially over the reference surface of the disk either to follow a track element regularly, or else to skip quickly over the distance separating any two track elements. Which sector or data block is selected depends on disk rotation, and in general this is fast enough to ensure a high data rate. In order to locate specific track elements and the portions thereof which are allocated to data storage, the reference surface of the disk is "formatted", i.e. it is marked with prerecorded reference marks which are interspersed between the data areas. A light spot can be constrained to center itself exactly on the axis of a track, in spite of any possible excentricity defects of the disk by making use of the repetitive nature of these reference marks. Some of the reference marks are made from prerecorded patterns which are specifically intended for synchronizing a clock which governs the serial spacing of the data and of the other reference marks scanned by the light spot.

The reference surface of an optical memory has a change in its optical characteristics at the locations of the prerecorded patterns, and this change is detected by a very fine light spot. Tracking errors and losses of synchronization which need to be compensated can thus readily be detected by optically scanning the disk. Other modifications of the optical characteristics are produced by writing data, but steps are taken to ensure that such data writing or "postrecording" does not effect the prerecorded patterns necessary for tracking and for clock synchronization.

The use of an optical memory such as a preformatted optical disk requires an optical reader device which includes: means for projecting as small as possible a light spot onto the reference surface of the disk; means for radially displacing said spot; photodetector means for detecting radiation which has interacted optically and has been returned from the illuminated region of the reference surface; and means for causing the disk to rotate. When using high information density optical disks, it is essential to provide radial servocontrol of the spot position together with automatic spot focusing.

Finally, in order to write information on the disk, it is necessary to be able to modulate the intensity of the light spot so as to induce erasable or indelible modifications in the optical characteristics in the data areas, which modifications represent useful information.

For optical disks having a track-to-track pitch of about two microns, reading by means of a spot having a diameter of about one micron makes it possible to use the tracking technique which consists in sampling prerecorded patterns which are excentrically located relative to the track axis. The circuit which provides radial servocontrol of the spot position is designed to compare two samples of the detected signal, which samples correspond to a pair of excentric patterns. The disposition used is such that the radial offset of the second scanned pattern relative to the first is in the same direction in each pair encountered.

If the angular subdivision of the disk into blocks and sectors takes place along radiuses, the excentric patterns are radially aligned at the same pitch as the pitch of the track elements. In order to increase the density of information on an optical disk, the track pitch must be reduced. The track pitch can be made considerably less than the above-mentioned value of two microns without causing difficulty in reading the data properly, however difficulties are created in detecting tracking errors.

The lack of resolution observed in the radial direction is attributable to the closeness of the prerecorded patterns, since the excentricity of these patterns makes it possible for them to be overlapped by the read light spot.

SUMMARY OF THE INVENTION

In order to mitigate this drawback, the present invention proposes reversing the offset order of the preformatted tracking patterns from one revolution or from one fraction of a revolution to the next. When reading a disk which has been modified in this way, a suitable switching circuit may be used to compensate for the order reversal.

More specifically, the present invention provides an information medium comprising a reference surface including adjacent track elements marked by prerecorded patterns in the form of spaced non-circular marks; with the equidistant scanning lines of said track elements being segmented into equal portions by orthogonal lines to form intersections, each of which is associated with at least one of said patterns; said patterns having equal offsets of opposite sign about said scan lines, at least one sequence of half-waves being marked along each of said track elements by the edges of said patterns, the invention including the improvement whereby said non-circular pattern shapes are symmetrical about mid lines lying between two immediately adjacent scan lines.

The invention also provides an optical reader device for information medium having the above-defined preformatted tracking pattern arrangement thereon, since the loop which performs tracking must include at least one commutator or toggle responsive to a track skipping command.

More specifically, the present invention also provides an information reader device comprising optical detector means for detecting read radiation after it has interacted with said support in that portion of its reference surface which is illuminated by a read spot, means for displacing said spot transversely relative to adjacent track elements in said reference surface, and sampling servocontrol means for constraining said spot to follow the scan lines of said track elements by scanning prerecorded patterns in the form of spaced-apart marks which serve to mark said track elements, the device including the improvement whereby said sampling servocontrol means are associated with commutator means actuated at least each time a track skip is performed over a distance equal to an odd multiple of the track element pitch.

BRIEF DESCRIPTION OF THE DRAWINGS

Embodiments of the invention are described by way of example with reference to the accompanying drawings, in which.

MORE DETAILED DESCRIPTION

In the following description, an optical disk has been selected as an example of the information medium, however the invention is equally applicable to media of other shapes, e.g. to cards, tapes, or cylinders.

The reference marks on the reference surface of the information medium are distinguished from the surrounding surface by a change in an optical characteristic such as reflectivity, and such a change may be obtained in various different ways. For example, the reference marks may be prerecorded by pressing the reference surface against a master having suitable surface irregularities (somewhat analogous to making an ordinary audio disk), or else the reference marks may be the result of an optical interaction between a write beam and an initially blank surface of an information medium. In either case, the essential point is that the medium has marks prerecorded on it to define the layout or "format" of the tracks to be followed.

Figure 4:
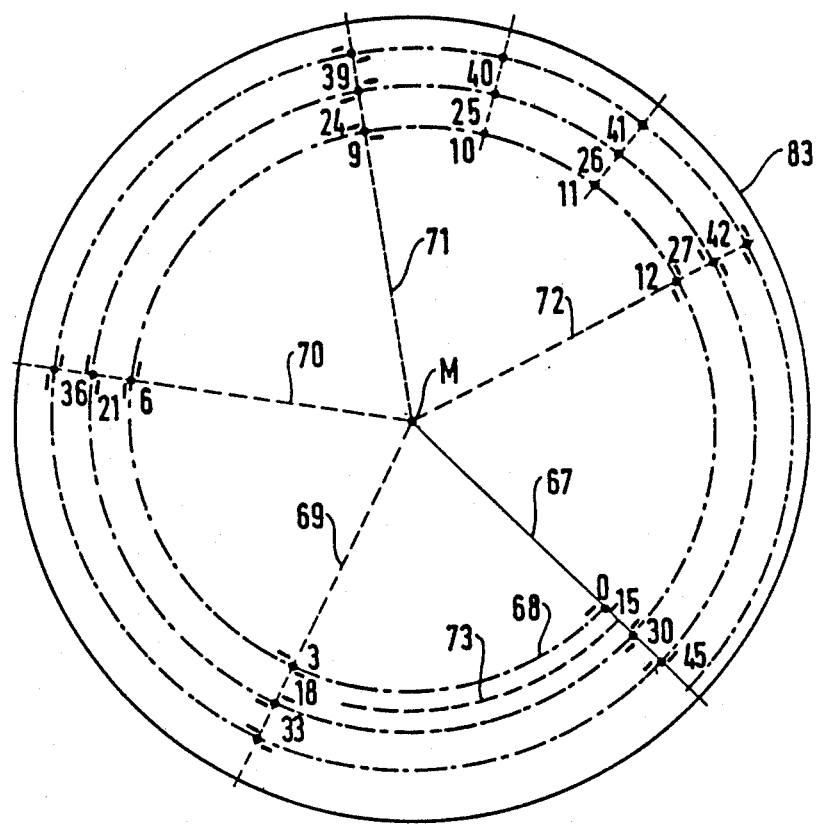
FIG. 4 is a diagram for explanation purposes.

Data is stored on the reference surface of an optical disk in the manner shown in the diagram of FIG. 4 which is a front view of an optical disk 83. The reference surface is subdivided angularly into sectors by radial lines 67, 69, 70, 71 and 72 which meet at the center M. As shown in FIG. 4, the sector lying between radiuses 71 and 72 is further subdivided into equal portions in order to store blocks of data. In the example shown, the number of sectors is odd as is the number of blocks per sector, thereby giving rise to an odd number of blocks per complete revolution of the disk. Naturally, in some cases, an even number of blocks per revolution may be chosen.

Data is stored along a track on an optical disk. In FIG. 4, this track is represented by its scan line 68 shown in dot-dashed form, and by way of non-limiting example this scan line is shown as being in the shape of a regular pitch spiral centered on M. The track is thus constituted by a grid of equidistant elements each of which represents one complete turn. Three turns are shown in FIG. 4, and each of them begins with the radius referenced 67. In order to illustrate the succession of data blocks along the tracks, the track axis is graduated with numbers lying in the range 0 to 45 and marked at the block header for each block. Between two adjacent (and consecutive) track elements there is an inter-track gap which is marked in FIG. 4 by a dashed line 73. Data areas extend between successive graduations, e.g. between graduations 9 and 10.

Another data area similar to the first-mentioned data area extends between graduations 24 and 25.

A data area adjacent to the first-mentioned data area may be the data area which extends between two other graduations on the same turn. Data areas are not immediately consecutive either radially or along the track since a special area is provided at each graduation to include prerecorded patterns for marking the track format.

Figure 1:
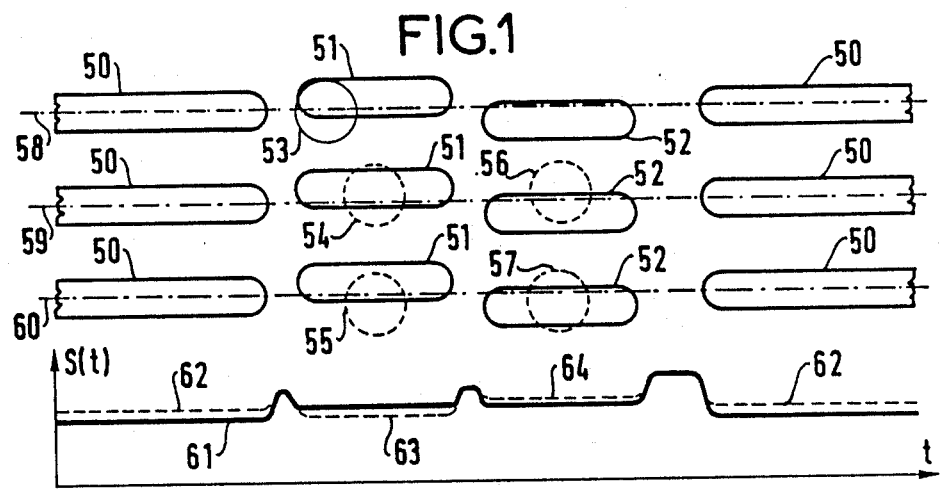
FIG. 1 shows a conventional arrangement of prerecorded patterns, together with a waveform diagram of the associated read signal.

FIG. 1 is a plan view of a portion of the contents of such special areas. The scan lines 58, 59, and 60 of three successive turns are marked, and at either end (to left and to right in the figure) of these special areas there can be seen the terminations 50 of the adjacent data areas. The terminations 50 are shown, for example, as being constituted by prerecorded patterns in the form of grooves which are interrupted by the special areas. It is assumed in the FIG. 1 example that the track elements are narrower than the intertrack gaps so that when optically reading a track using a spot of light 53, the track appears to be darker than the intertrack gap since it defracts more light. The radial lines 67, 69, 70, 71, and 72 are othogonal to the grid of scan lines, and the scan lines are equidistant from one another.

The middle of FIG. 1 shows prerecorded patterns 51 and 52 which are used for determining the tracking error of the spot relative to the axis of the track. These patterns, in association with other patterns (not shown), constitute the header of a sector or of a data block.

The patterns 51 and 52 are equally and oppositely offset on either side of the track axis in such a manner as to ensure that they interact equally with a centered spot 53. The bottom of FIG. 1 shows the read signal S(t) delivered by a photosensor which senses radiation due to the interaction of the read spot with the pattern area plotted as a function of time t. The solid line curve 61 relates to a spot which is scanning the track without any tracking error.

It can be seen that the signal S(t) rises each time the portion of the spot which illuminates the pattern surround increases. The detected level is thus higher while the patterns 51 and 52 are being scanned since they are offset from the track axis, and it is higher still when the spot passes over a completely blank or unrecorded region of the disk.

The dashed lines 54 and 56 of a spot outline correspond to different stages in scanning along scan line 59 for a spot which is itself offset towards scan line 58. The signal S(t) then has the changes in level which are illustrated by the dashed line at the bottom of FIG. 1. The level rises in portions 62 and 64 because the spot covers less of the patterns 50 and 52. In contrast, the level is lower in portion 63 because the spot is offset in the same direction as is the pattern 51. By sampling the levels 63 and 64 and by subtracting the sampled values from each other, a continuous tracking error signal is obtained. The dashed lines 55 and 57 relate to a spot which is offset in the opposite direction relative to scan line 60, thereby providing an error signal of opposite sign, with the level 63 being higher than the level 64 in this case. In a variant prior art embodiment, not shown in FIG. 1, only one of the patterns 51 and 52 is provided in any given special area, with the other pattern being provided in the immediately preceding and in the immediately following special areas.

The configuration shown in FIG. 1 is satisfactory so long as the gap between successive scan lines 58, 59, and 60 is relatively large compared with the diameter of the read spot. So long as the spot is small enough to be certain of not overlapping two adjacent patterns 51 or 52 which are at the same spacing as the centered patterns 50, there is no problem.

The same is no longer true when the same kind of excentric pattern is used with tracks at a closer pitch.

Figure 2:
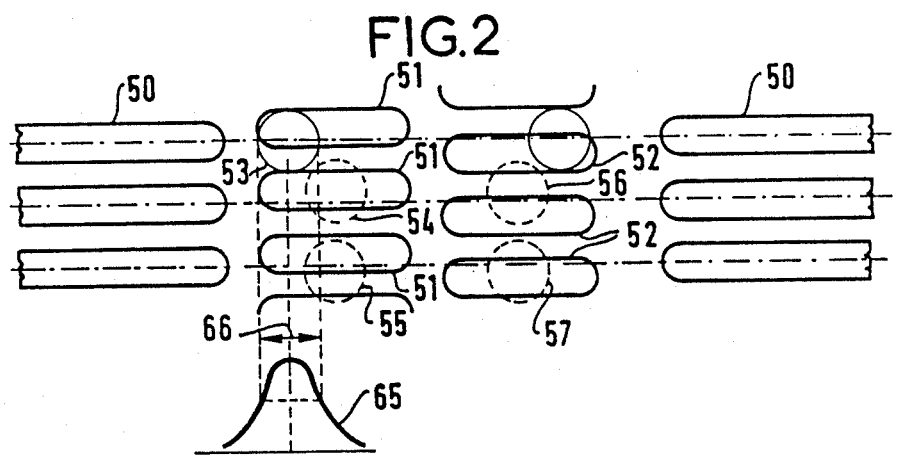
FIG. 2 is a diagram similar to FIG. 1 provided for explanation purposes.

FIG. 2 shows a situation when the track density is one and a half times greater than that shown in FIG. 1. The diameter 66 of spot 53 represents, for example, the half-height width of the response curve 65 to received light intensity on the surface of the information medium. Although the spot 53 is still capable of reading data written along the patterns 50, its interaction with the patterns 51 and 52 may lead to faulty detection of the tracking error. In the offset position marked 56, the spot overlaps two patterns 52, and similarly in offset position 55 it overlaps two patterns 51. As a result, the levels 63 and 64 shown in FIG. 1 are no longer sufficiently different to provide proper tracking. This loss of transverse readability appears before the level of crosstalk between adjacent data tracks hinders proper reading of the data, so long as the spot is properly centered.

In order to improve transverse readability between the special areas, the present invention suggests changing the distribution of the prerecorded patterns which are used for detecting tracking errors.

Figure 3:
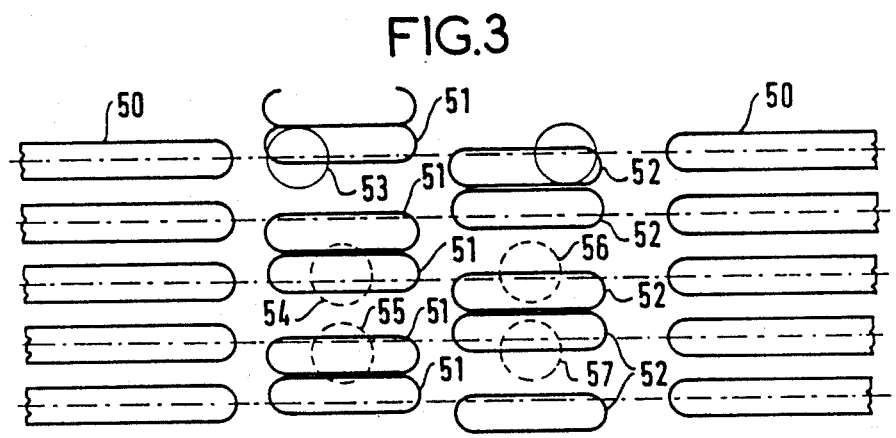
FIG. 3 shows an arrangement of preformatted tracking patterns in accordance with the invention.

FIG. 3 is a plan view of a first disposition of patterns in accordance with the invention. The track pitch and the read spot size are essentially the same as those shown in FIG. 2, but the transverse distribution of the prerecorded patterns 51 and 52 is no longer regular.

The prerecorded patterns 51 and 52 are offset relative to the track axes by the same absolute amount as in the two preceding figures, however the order of the offset signs is swapped over from one track element to the next.

The inter-track axis is shown in FIG. 4 in the form of a dashed line 73, and FIG. 4 also shows prerecorded patterns having the FIG. 3 disposition in the vicinity of its radial lines 67, 69, 70, 71, and 72. Supposing that an outward offset towards the periphery of the disk is said to be positive in sign, the offset order is plus-minus on the turn beginning at graduation zero and ending at graduation 15. The turn which begins at graduation 15 and ends at graduation 30 has its offset in the order minus-plus and returns to the previous shape on recrossing the radius referenced 67. When data blocks are preceded by a pair of prerecorded patterns 51 and 52 which are offset in the opposite direction, there may be any number of data blocks per revolution, but in order to extract a tracking error signal on the basis of sampling the prerecorded patterns 51 and 52, account must be taken of the order reversal which is imposed each time the reference radius 57 is crossed. However, there is no reason why there should not be several reversals in the offset order, for example one reversal at each of the radiuses referenced 67, 69, 70, 71, and 72.

When data blocks are preceded by a single prerecorded pattern which is alternately offset in a positive and then in a negative direction, each revolution or track element may include an even number or an odd number of patterns. If the number is odd, the desired pattern distribution is obtained without making any changes in the alternating sequence. However, if there is an even number of blocks, the sign of the offset must be swapped over at least once per revolution.

In order to obtain a good idea of the disposition of the patterns in the latter case, it may be imagined that the patterns 51 and 52 in FIG. 3 are separated by a data block 50.

Figure 5:
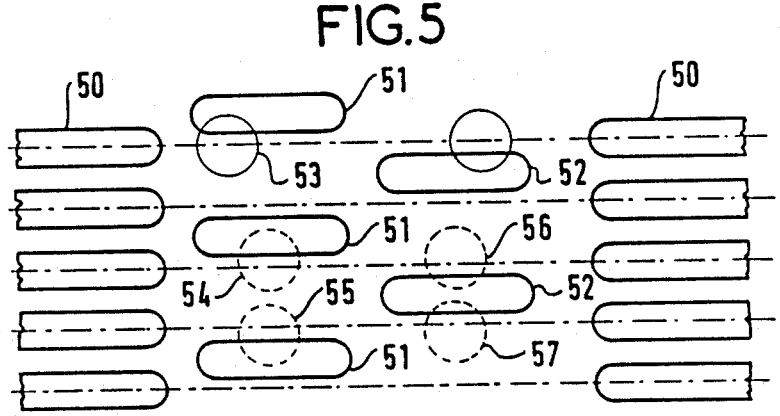
FIG. 5 shows a variant embodiment of the invention.

FIG. 5 shows a pattern arrangement which also lies within the invention. This is a limiting case in which the patterns 51 and 52 are offset so far that they fully occupy the inter-track gap. Pattern density is reduced to one-half since the offset is equal to one-half of the track pitch. Any disposition lying between those illustrated in FIGS. 4 and 5 may also be used.

The prerecorded pattern is provided by means of a photosensitive resin which is irradiated using a light beam whose spot creates a latent image during a single pass, which image gives rise to a pattern of constant width W.

Figure 11:
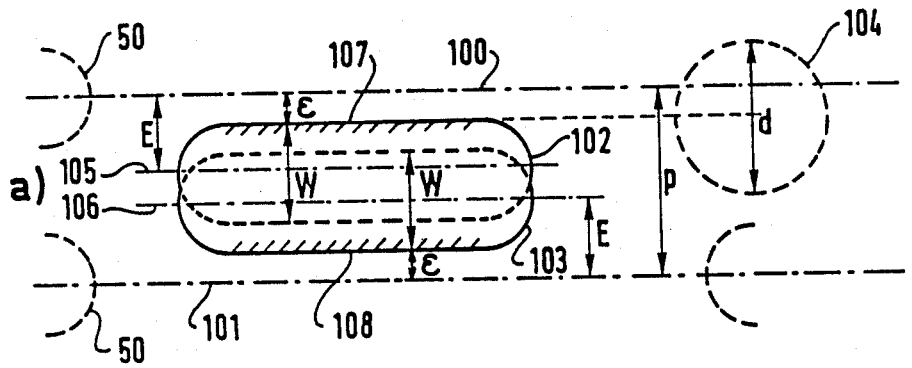
FIG. 11 consisting of (a) through (d), is a diagram provided for explanation purposes.
Figure 11:
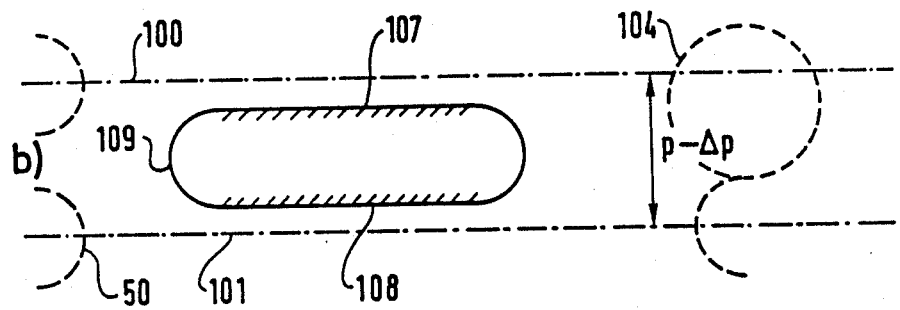
Figure 11:
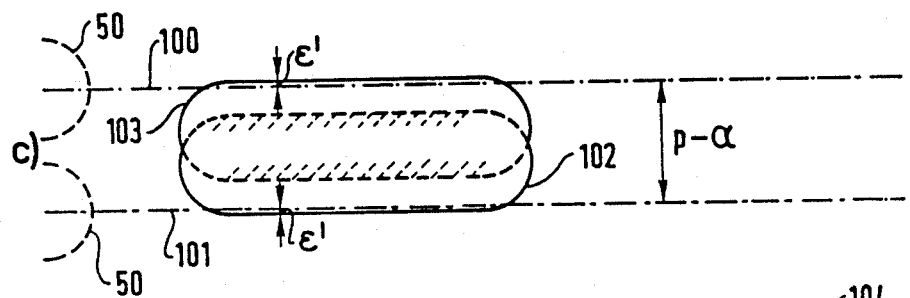
Figure 11:
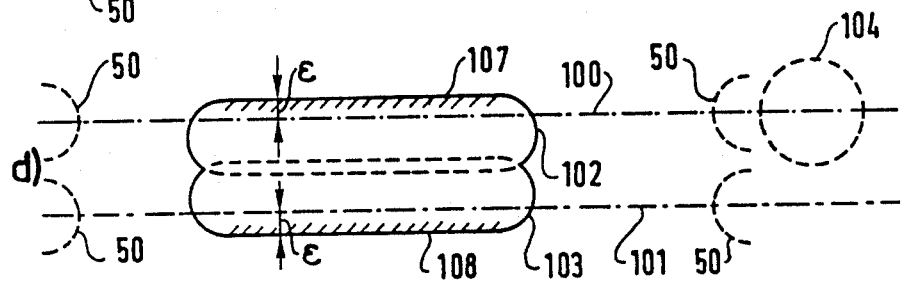

The pattern is offset by displacing the spot laterally relative to the scan line. However, when the track element pitch is reduced and when offset reversal is performed in accordance with the invention, the prerecorded pattern may have an overlapping shape due to two successive irradiations. The diagrams of FIG. 11 show several situations which may occur in practice. The offset of a pattern may be described using two magnitudes, namely the gap $\epsilon$ between the edge of the pattern and the scan line, and the offset E between the axis of a pattern produced by a single irradiation and the scan line.

Diagram a of FIG. 11 shows two scan lines 100 and 101 and a pattern provided by two irradiations to provide oblong zones 102 and 103 of width W. The axis 105 of the zone 102 is offset by E relative to scan line 100, and the same offset with opposite sign characteristics the position of the axis 106 of the zone 103 relative to scan line 101.

The edge 107 of zone 102 is separated by a gap $\epsilon$ from the line 100 and the same gap of opposite sign exists between the edge 108 of the zone 103 and the line 101. Taking the gap $\epsilon$ and the offset E as being positive in sign, with the edge 107 and the axis 106 being on the same side of the axis 100, it can be seen that these magnitudes satisfy the algebraic relationship $E - \epsilon = W/2$ where $W/2$ is a positive number. Since the edge 107 may change side (see FIG. 11d) the sign of the gap $\epsilon$ may be inverted. As a result, an offset E of zero value is characterized by $\epsilon = -W/2$. This particular value for the gap $\epsilon$ must therefore be avoided when writing the offset patterns.

This said, FIG. 11a shows the contour 104 of a read spot which is offset relative to the scan line 100. In order to clarify one's ideas, this positive offset may be equal to $\epsilon$, for example, which means that half of the spot interacts with the resulting pattern and only the edge 107 is involved in this interaction.

Thus, the only parameter of the resulting pattern which has an effect on detecting the tracking error is the gap $\epsilon$ which must be different from the value $-W/2$, but which may be positive, negative, or zero.

With the pitch p illustrated in FIG. 11a, the resulting pattern exactly satisfies an offset E and a gap ϵ which comes from the relationship: $\epsilon = E - W/2$.

By reducing the pitch p by an amount Δp, FIG. 11b shows the special case where the zones 102 and 103 overlap each other exactly, thereby providing a single resulting pattern 109 which interacts with the spot 104 in a manner which is free from the influence of pitch variation. However, the value $p - \Delta p$ equal $W + 2\epsilon$ represents the minimum pitch value which can be accepted when making prerecorded patterns. For example, and as shown in FIG. 11c, if the pitch is reduced to a value $p - \alpha$ which is less than $W - 2\epsilon$, the resulting pattern has a shape such that its outer edges are no longer separated from the scan lines 100 and 101. A new gap $\epsilon'$ is created which depends on the pitch value, and this is a drawback.

However, it is worth mentioning that the resulting pattern shown in FIG. 11c is defective only in the way it has been made. If the zones 102 and 103 from which it is built up had had a new gap (substantially equal to zero) different from the gap ϵ, the situation shown in FIGS. 11a or 11b could have obtained.

It may be concluded from the above that the concept of the offset of an overlapping pattern is related, above all, to the gap between the pattern and the scan line within pitch limits for which it is reproducible. It may be observed that patterns obtained in accordance with the invention are symmetrically disposed about the average of scan lines 100 and 101. It may also be observed that a zero gap ϵ does not mean that the offset is zero, and that it is a gap $\epsilon = -W/2$ which corresponds to no offset. FIG. 11d shows an example of the pattern which results from the gap ϵ being of opposite sign to that shown in FIG. 11a thereby enabling the pitch to be considerably reduced. Increasing the pitch of the track elements may prevent the irradiated zones 102 and 103 from overlapping, so that the disposition changes from one to two patterns, however this does not disturb the gap ϵ.

However, it is possible to make prerecorded patterns which simultaneously comprise at least one offset portion and at least one centered portion located at the end of the pattern. The presence of the centered end portions makes it possible to create read signal transitions during prerecorded pattern scanning which, after suitable processing, are suitable for generating a synchronizing signal. This signal is transmitted only when scanning a prerecorded pattern which has been encoded for the purpose, and no other readable entity on the information medium is suitable for generating such a signal.

Figure 6:
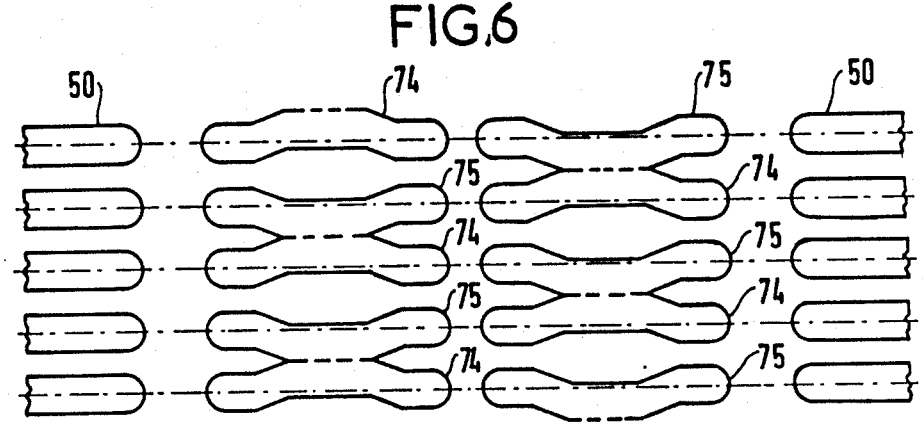
FIG. 6 shows another variant embodiment of the invention in which patterns are also provided for synchronizing the phase of a clock.

FIG. 6 shows the shape of dual purpose prerecorded patterns. The unit pattern appears in the top left and bottom right corners of FIG. 6. It is of substantially uniform width but its middle is offset whereas its ends are centered on the scan line (shown as a dot-dashed line). By virtue of the offset reversal rule mentioned above, unit patterns may run into one another as shown in FIG. 6, thereby constituting a elongate X-shape.

Figure 7:
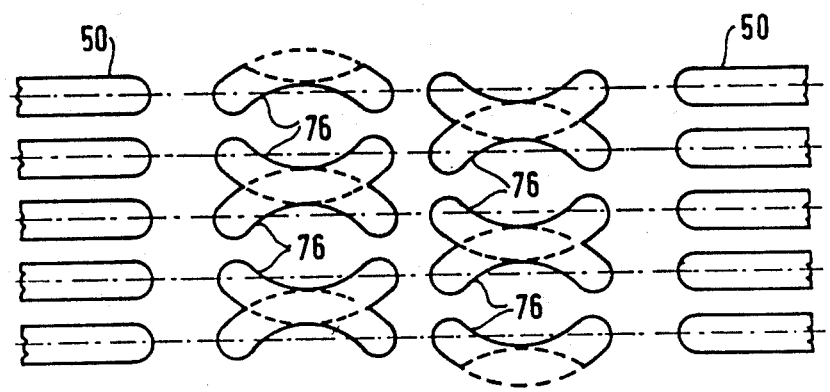
FIG. 7 shows a pattern shape which is more compact than that shown in FIG. 6.

FIG. 7 shows a similar shape but with the prerecorded patterns overlapping to a maximum extent.

The offset portions of the patterns obey the requirements described with reference to FIG. 11. When the prerecorded patterns are irradiated, the concave edge of each unit pattern must be irradiated once only, since otherwise it is the convex portion which would determine the final profile of the pattern.

By virtue of the dispositions illustrated in FIGS. 3, 5, 6, and 7, it can be seen that positive and negative offsets meet in a determined order on a track element, and that this order is reversed for two adjacent track elements. This order reversal or permutation must be matched in the circuit which determines the tracking error.

It is thus generally necessary to define the scanning phase on the information medium which corresponds to the current order permutation.

In the information medium shown in FIG. 4, the order of track elements is marked by the radius line 67.

Figure 8:
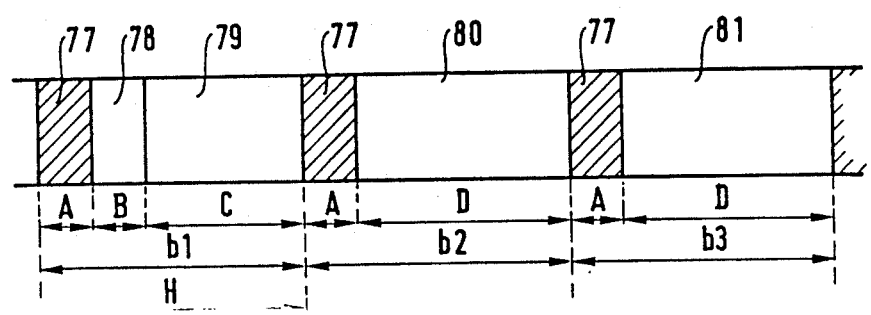
FIG. 8 is a diagram showing an example of a sector header for a preformatted optical disk.

FIG. 8 shows the beginning of a sector having blocks of data at regular intervals. By scanning the sector which extends along a track element over a fraction of a revolution, e.g. over 1/32nd of a turn, special areas 77 are encountered at regular intervals and include prerecorded patterns for providing synchronization and tracking. These areas may be scanned in the left-to-right direction with reference to FIG. 8. Typically each area 77 has an extent A which is eight times the size of a bit cell, and it is separated from its nearest neighbor by an intermediate area which may contain 96 bit cells. Thus, each zone $b_1$, $b_2$, $b_3$ constitutes a group of 104 cells. The sector header H is constituted by a first group $b_1$ which comprises an area 79 which is reserved for memory zone addressing. The area 79 contains the sector address expressed by means of three 24-bit words. The intermediate area 78 may contain a symbol indicating the permutation order applicable to each revolution, for example. There then remain areas 80, 81, et seq which are allocated to storing data. For example, extent B may comprise 24 bits, with area 79 having an extent C which is 72 bits long, and each data area may have an extent D of 96 bits.

An information support as described above can only be read after the circuits for constraining the light spot to follow the track elements or to skip several tracks have been modified.

Figure 9:
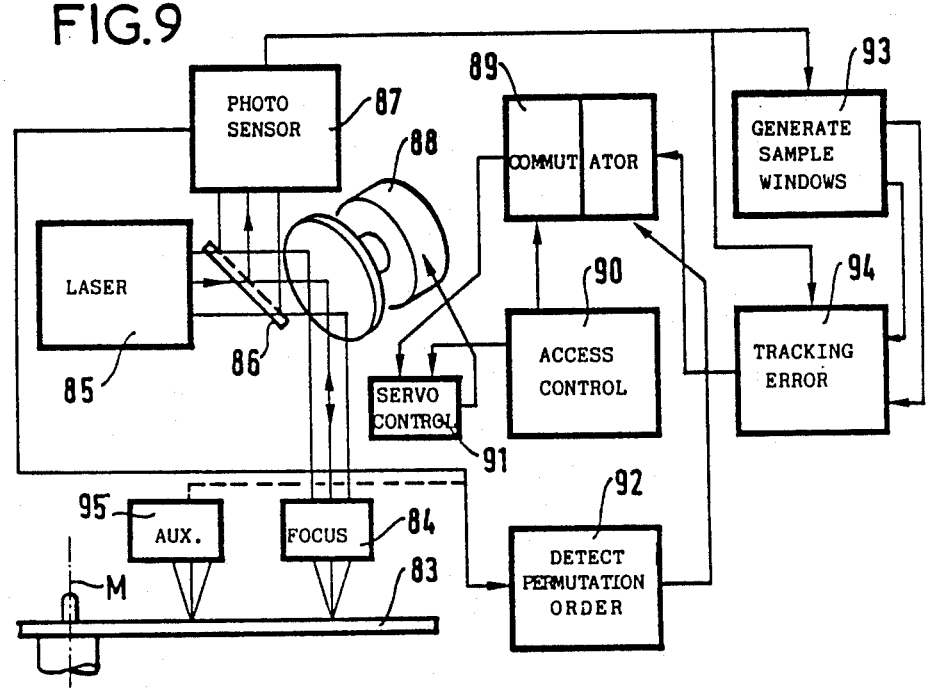
FIG. 9 is a block diagram of a reader device in accordance with the invention.

FIG. 9 is a block diagram of a first embodiment of an optical reader device in accordance with the invention.

The information medium 83 is carried by a rotary spindle having an axis M and driven at a uniform speed of rotation, for example. The reference surface of the information medium 83 is illuminated by a laser source 85 via a semi-transparent blade 86, a pivoting mirror and a focusing lens 84. The pivoting mirror is rotated by a motor 88 so as to displace the light spot formed by the lens 84 over the reference surface of the medium 83. This displacement takes place transversely relative to the track element scan line. The light which has interacted with the information medium is returned via the objective lens 84 and via the pivoting mirror and the blade 86 to photosensitive means 87 which deliver an electrical read signal containing the successively read information along each track element.

The electrical signal is applied to a sampling window generator 93, to a circuit 94 for evaluating the offset of the spot relative to the scan line and, if necessary, to a circuit 92 for identifying the special order permutation mark. A control circuit 91 actuates the motor 88 as a function of two input magnitudes which are the tracking error to be compensated and the amplitude of the track skip to be performed. The amplitude of the track skip is determined by a control circuit 90 which controls disk access depending on external read or write requests and which is suitable for acting on an access motor (not shown in FIG. 9). The magnitude representative of the tracking error is produced by the circuit 94 without taking account of the permutation order of the prerecorded patterns provided for the purpose. Consequently, the sign of the signal delivered by the evaluator circuit 94 must be modified as required, and to this end the invention provides for a commutator circuit 84 to be inserted between the circuits 91 and 93 in order to ensure that the tracking error signal has the appropriate sign and thus ensure that the servocontrol loop for compensating this error functions properly. The commutator circuit 89 shown in FIG. 9 comprises two stages connected in cascade for swapping over the connections between its inlet and outlet terminals as a function of two different commands. One of these commands is provided by the circuit 90 when skipping an odd number of tracks. The other command is provided by the circuit 92 for identifying the order permutation mark present in one of the above-mentioned areas 78 and encountered during a scan.

If a track skip coincides with this mark being detected, both stages change over thereby changing the sign of the error twice over, and thus returning to the original sign.

In a variant, the information medium 83 may alternatively be provided with a reference track which is solely constituted by prerecorded marks relating to synchronizing its passage past a read head. This applies, for example, if the information medium is a disk including a ring which is concentrically mounted with the annular area containing the track elements. This ring may be indexed by a special mark concerning the permutation order of the prerecorded marks situated in the annular area where information is stored. The optical ring is scanned by an auxiliary optical head 95 which delivers a read signal characteristic of disk rotation. As illustrated in dashed lines in FIG. 9, this read signal takes the place of the read signal from the detector circuit 87 as the input signal to the circuit 92. In this case, the zone 78 shown in FIG. 8 may contain a special signal indicative of sector address scanning.

In FIG. 9, the commutator circuit 89 is shown outside the circuit 94 for determining the spot offset signal by comparing the two read signal samples taken while scanning the offset portions of the prerecorded patterns.

Figure 10:
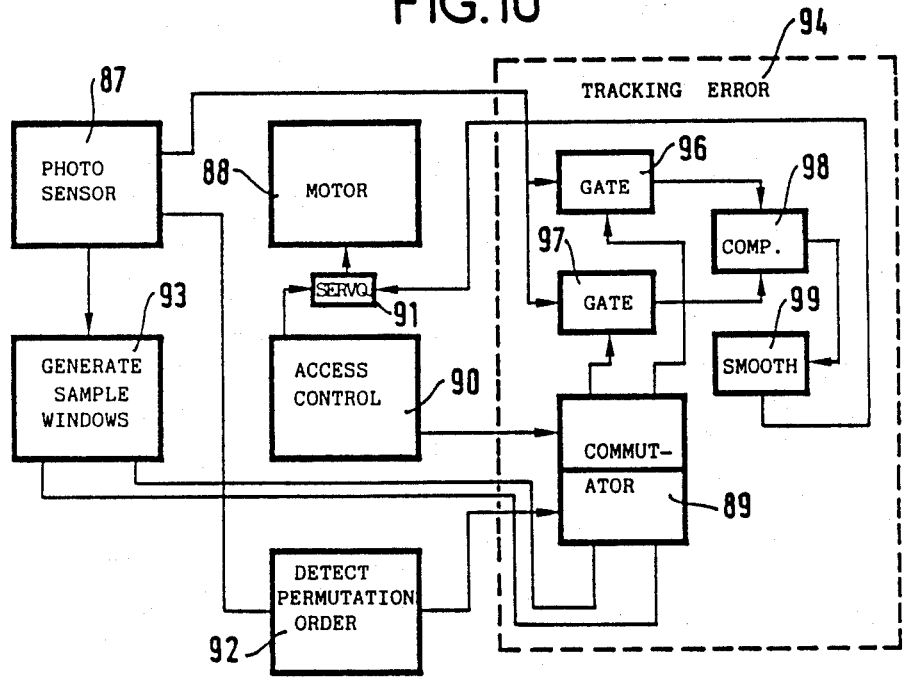
FIG. 10 is a block diagram of a variant reader device in accordance with the invention.

The samples may also be swapped over at the input to the comparator circuit as shown in FIG. 10.

The rectangle referenced 94 includes the circuit 89, whereas the items outside the rectangle 94 are the same as in FIG. 9.

The circuit for evaluating the spot offset includes two analog gates 96 and 97 which receive the read signal delivered by the detector circuit 87. Each gate is controlled by a sampling pulse from the generator circuit 93, but these two pulses are applied to the gates 96 and 97 after being switched by the circuit 89 in such a manner as to ensure that the sample available at the output from the gate 96 is always representative of interaction between the spot and a prerecorded pattern whose offset is of predetermined sign. The same situation applies to the other gate and to the other sign of offset, so that the comparator circuit 98 always provides a spot offset value of the appropriate sign. This value may be stored or smoothed by a circuit 99 prior to being applied to the control circuit 91. The commutator circuit 89 is controlled in the same way as before and it could equally well have been integrated in the generator 93.

The reader devices shown in FIGS. 9 and 10 may be rendered compatible with reading information media using prerecorded marks which are all arranged in the same order. This can be done by locking the commutator 89 in a single, preselected state. The circuit 92 for detecting the mark which indicates that the order is being swapped over can readily recognize which mode of operation to put into effect, if used in conjuction with a timing circuit.

The invention is also applicable to prerecorded patterns including two offsets of opposite sign. This version stems from the configurations shown in FIGS. 6 and 7 where the prerecorded patterns drift towards one another parallel to the track element scan line until their centered ends meet. Since the ends are lost by virtue of the X-shaped patterns meeting, the ends of the centered patterns 50 may be used for defining the transition code necessary for synchronizing the scan. It is also possible to add a centered pattern to the head or tail end of the structure built up from meeting X-shaped patterns such that the two ends thereof provide the necessary additional information for four-transition decoding.

If account is taken of the track element addresses read from the medium, there is no need for special means to be provided for indicating the order permutation. For example, if two consecutive track elements have addresses numbered n and n+1, the change in parity may be used for selecting the appropriate permutation. In this case, the circuit 92 in FIGS. 9 and 10 is used to determine the parity of track element addresses and to indicate each parity change which occurs during a revolution. The sector addresses could also be used by detecting, for example, the changeover from the last sector of one track element to the first sector of the next, and by changing over the order permutation when the first sector is encountered.

What is claimed is:

1. A pre-grooved information medium, comprising:
a recording surface;
a plurality of pre-recorded patterns in the form of spaced marks which define boundaries for tracking at least two tracks on said surface,
wherein said pre-recorded patterns are located to be symmetrical to a midline disposed mid-way between said two tracks for use in tracking control.

2. An information medium as in claim 1 wherein each said pattern consists of one geometric shape.

3. A medium as in claim 1 wherein there are a plurality of said track elements and said track elements are concentric around an annular area, and further comprising a plurality of orthogonal lines forming intersections with said scanning lines and segmenting said scanning lines into equal portions, said orthogonal straight lines passing through the center of said annular area.

4. A medium as in claim 3 further comprising an annular ring concentric with said annular area.

5. A medium as in claim 1 wherein said patterns are located to have equal offsets of opposite sign around said scanning line to form a periodical series along each of said scanning lines, said offsets being successively of one sign then of the opposite sign, and wherein said offsets are uniformed from one end to the other end of each of said patterns.

6. A medium as in claim 1 wherein each said pattern comprises a central part that is offset with respect to the scanning line, and to terminal portions located on said scanning line.

7. A medium as in claim 6 wherein said pattern is in the shape of an "X".

8. A medium as in claim 1 wherein said offsets are constituted by a predetermined gap between the edge of a pattern and a nearest scan line.

9. A medium as in claim 8 wherein said patterns include at least one centered portion with a half length of said centered portion being different from predetermined gap when negative.

10. A medium as in claim 1 wherein each said pattern consists of two geometric shapes disposed to be symmetric to said midline.

11. A pre-grooved information medium, comprising:
a recording surface;
a plurality of pre-recorded patterns in the form of spaced marks which define at least first, second and third tracks on said surface, wherein at least one of said pre-recorded patterns are located to be symmetrical to a midline disposed midway between said first and second tracks for use in tracking control in both of said first and second tracks, and at least one of said prerecorded patterns are located to be symmetrical to a midline disposed midway between said second and third tracks for use in tracking control of said second and third tracks, said second track defined between said two midlines.

12. A pre-grooved information medium, comprising:
a recording surface;
a plurality of pre-recorded patterns in the form of spaced marks which define boundaries for tracking at least two tracks on said surface,
wherein all of said pre-recorded patterns are located to be symmetrical to a midline disposed mid-way between said two tracks for use in tracking control for both of said two tracks.

* * * * *